United States Patent
Riley

(10) Patent No.: US 8,291,145 B2
(45) Date of Patent: Oct. 16, 2012

(54) METHOD AND APPARATUS FOR SETTING A PRIMARY PORT ON A PCI BRIDGE

(75) Inventor: Dwight D. Riley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2266 days.

(21) Appl. No.: 10/915,174

(22) Filed: Aug. 10, 2004

(65) Prior Publication Data

US 2006/0036796 A1    Feb. 16, 2006

(51) Int. Cl.
G06F 3/00 (2006.01)
G06F 5/00 (2006.01)
G06F 13/12 (2006.01)
G06F 13/14 (2006.01)
G06F 13/36 (2006.01)
G06F 13/00 (2006.01)
G01R 31/08 (2006.01)

(52) U.S. Cl. ............... 710/311; 710/8; 710/51; 710/62; 710/305; 710/314; 710/316; 710/317; 370/248

(58) Field of Classification Search .................. 710/200, 710/312, 317, 313, 51, 260, 264; 709/220; 361/721

See application file for complete search history.

(56) References Cited

U.S. PATENT DOCUMENTS

| | | | |
|---|---|---|---|
| 5,564,060 A * | 10/1996 | Mahalingaiah et al. | 710/51 |
| 5,835,741 A | 11/1998 | Elkhoury et al. | |
| 5,937,173 A | 8/1999 | Olarig et al. | |
| 5,954,809 A | 9/1999 | Riley et al. | |
| 6,119,191 A * | 9/2000 | Neal et al. | 710/311 |
| 6,148,359 A | 11/2000 | Elkhoury et al. | |
| 6,182,178 B1 * | 1/2001 | Kelley et al. | 710/314 |
| 6,266,731 B1 | 7/2001 | Riley et al. | |
| 6,272,113 B1 * | 8/2001 | McIntyre et al. | 370/248 |
| 6,317,804 B1 * | 11/2001 | Levy et al. | 710/305 |
| RE37,980 E | 2/2003 | Elkhoury et al. | |
| 6,557,068 B2 | 4/2003 | Riley et al. | |
| 6,715,023 B1 * | 3/2004 | Abu-Lebdeh et al. | 710/317 |
| 6,732,218 B2 * | 5/2004 | Overtoom et al. | 710/313 |
| 6,741,471 B2 * | 5/2004 | Fujii et al. | 361/721 |
| 6,807,639 B2 * | 10/2004 | Shatas et al. | 713/400 |
| 7,167,941 B2 * | 1/2007 | Iskiyan et al. | 710/316 |
| 2001/0027505 A1 | 10/2001 | Rekeita et al. | |
| 2002/0073258 A1 | 6/2002 | Riley et al. | |
| 2002/0161929 A1 | 10/2002 | Longerbeam et al. | |
| 2003/0035416 A1 | 2/2003 | Zirojevic et al. | |
| 2003/0065842 A1 | 4/2003 | Riley et al. | |
| 2003/0065845 A1 | 4/2003 | Riley | |
| 2003/0065847 A1 | 4/2003 | Goodrum et al. | |
| 2003/0065868 A1 | 4/2003 | Riley et al. | |
| 2003/0097428 A1 * | 5/2003 | Afkhami et al. | 709/220 |
| 2003/0123461 A1 | 7/2003 | Riley et al. | |

(Continued)

OTHER PUBLICATIONS

"PCI-to-PCI Bridge Architecture Specification," Revision 1.1 (Dec. 18, 1998).*

(Continued)

*Primary Examiner* — Chun-Kuan Lee
*Assistant Examiner* — Henry Yu

(57) ABSTRACT

An apparatus and a method for setting a primary port on a PCI multi-port bridge. More specifically, there is provided a method that comprises detecting a configuration signal at the PCI multi-port bridge and automatically setting the primary port on the PCI multi-port bridge based on the configuration signal. A system for implementing the method is also provided.

40 Claims, 5 Drawing Sheets

U.S. PATENT DOCUMENTS

2003/0225956 A1  12/2003  Riley et al.
2004/0003162 A1   1/2004  Chan et al.
2004/0225782 A1*  11/2004 Avery .......................... 710/200
2004/0230735 A1*  11/2004 Moll ........................... 710/312

OTHER PUBLICATIONS

"PCI-to-PCI Bridge Architecture Specification" (Revision 1.1, Dec. 18, 1998).*

* cited by examiner

METHOD AND APPARATUS FOR SETTING A PRIMARY PORT ON A PCI BRIDGE

BACKGROUND

This section is intended to introduce the reader to various aspects of art that may be related to various aspects of the present invention, which are described or claimed below. This discussion is believed to be helpful in providing the reader with background information to facilitate a better understanding of the various aspects of the present invention. Accordingly, it should be understood that these statements are to be read in this light, and not as admissions of prior art.

Flexible computer systems are a growing trend in the computer industry. Of particular interest are computer systems that include an interconnect architecture that permits flexibility of controller location. Unlike traditional computer systems in which the interconnect architecture is designed such that the controller (which may include a host-bridge or root-complex) may only be installed in a single location, a system with a flexible interconnect architecture may permit the controller to be connected to the computer system's interconnect architecture at any one of a number of connection points. This design flexibility is beneficial for the user because the user does not have to worry about installing the controller into one particular place in order for the computer system to work properly.

One traditional method of creating an interconnect architecture within a computer system is with multi-port bridges that use standard peripheral components interconnect ("PCI"). Standard PCI was first developed in the early 1990s and has since been adopted by a majority of computer manufacturers. It should be understood that the term standard PCI as used in this specification includes conventional ($1^{st}$ generation) PCI, PCI-X, PCI express, or any other derivative that uses PCI semantics. Because of the widespread industry acceptance of standard PCI, standard PCI multi-port bridges are typically used in traditional computer systems to form the interconnect architecture between the computer components. Standard PCI multi-port bridges, however, are typically not suitable for use in flexible interconnect architectures because standard PCI multi-port bridges may need to be preset with the location of the controller and thus will not permit controller location flexibility. An improved PCI multi-port bridge that could permit a flexible interconnect architecture is desirable.

BRIEF DESCRIPTION OF THE DRAWINGS

Advantages of one or more disclosed embodiments may become apparent upon reading the following detailed description and upon reference to the drawings in which.

DETAILED DESCRIPTION

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
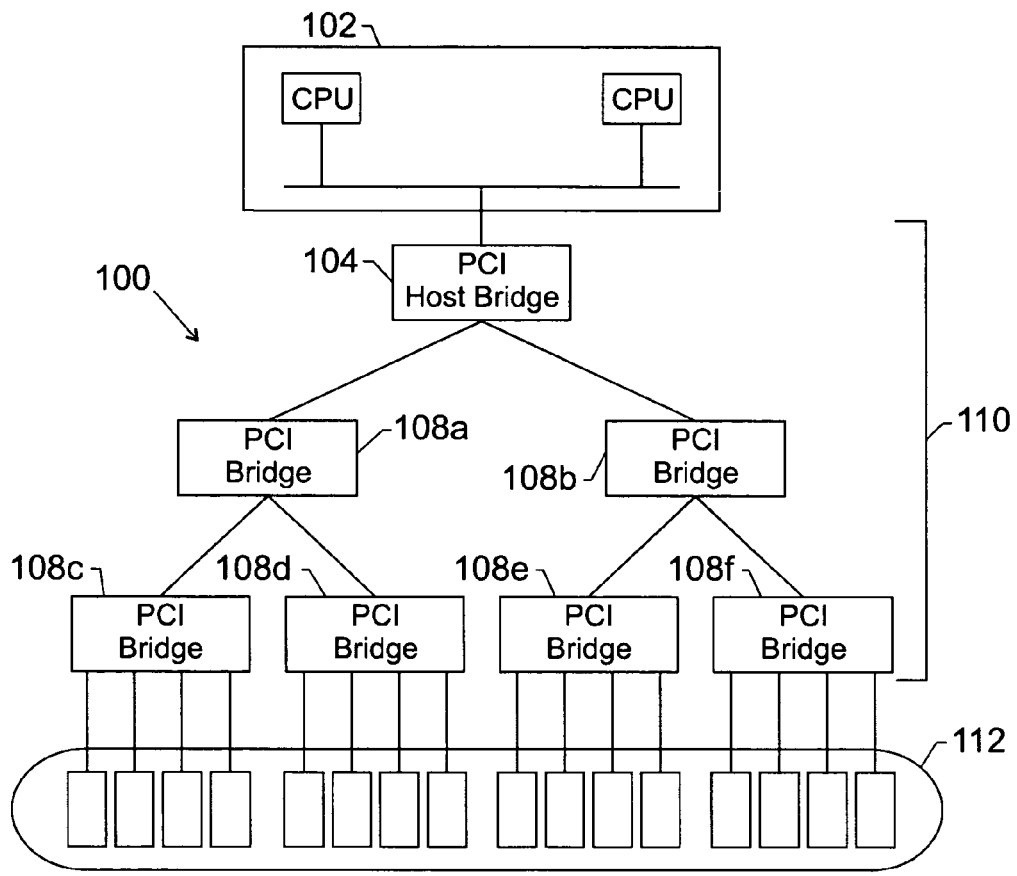
FIG. 1 is a block diagram of a traditional PCI computer system.

Turning now to the drawings and referring initially to FIG. 1, a block diagram of a traditional peripheral components interconnect ("PCI") computer system is illustrated and generally designated by the reference numeral 100. The PCI computer system 100 may include one or more central processing units ("CPUs"), collectively referred to as a controller 102. The controller 102 is typically coupled to a PCI host bridge 104, which is also referred to as a Root-Complex. The PCI host bridge 104 may be coupled to one or more standard PCI multi-port bridges 108a-f, which are also known to as PCI switches. The PCI multi-port bridges 108a-f and the PCI host bridge 104 form an interconnect architecture referred to as a PCI hierarchy 110. A variety of PCI devices collectively designated by the reference numeral 112, such as video cards or external storage devices may be coupled to the end points of the PCI hierarchy 110.

The PCI multi-port bridges 108a-f in the PCI hierarchy 110 are arranged in a hierarchical tree structure. The PCI host bridge 104 forms the root of the PCI hierarchy 110 with the PCI multi-port bridges 108a-f and the PCI devices 112 forming the branches and leaves. Each of the PCI multi-port bridges includes a plurality of ports. One of these ports is designated as the "primary port." The primary port is important in the PCI multi-port bridges 108a-f because the PCI hierarchy 110 is designed to pass information to the controller 102 by "following" the primary ports. For this reason, each of the PCI multi-port bridges 108a-f can only have one port designated as the primary port and that primary port must point "upstream" toward the controller 102.

As stated above, the PCI multi-port bridges 108a-f may also have a plurality of secondary ports which are used to interconnect the PCI multi-port bridges 108a-f to each other and to the PCI devices 112. In addition, because the primary port on the PCI multi-port bridges 108a-f is pre-configured and fixed, the location of the controller 102 is also in a fixed location in the system 100. This is not a problem in the traditional PCI computer system 100 because the controller is always located at the top of the PCI hierarchy 110.

The PCI hierarchy 110 defines a single global view of resources in the PCI computer system 100. This type of interconnect architecture works well in systems based on a single controller 102 that sits in a fixed location on top of a fixed interconnect architecture. As described above, however, many modern computer systems are designed to permit flexibility in both controller number and controller location. Because the standard PCI multi-port bridges 108*a-f* require a single controller in a fixed location, they are not typically suited for use in a flexible interconnect architecture system.

Figure 2:
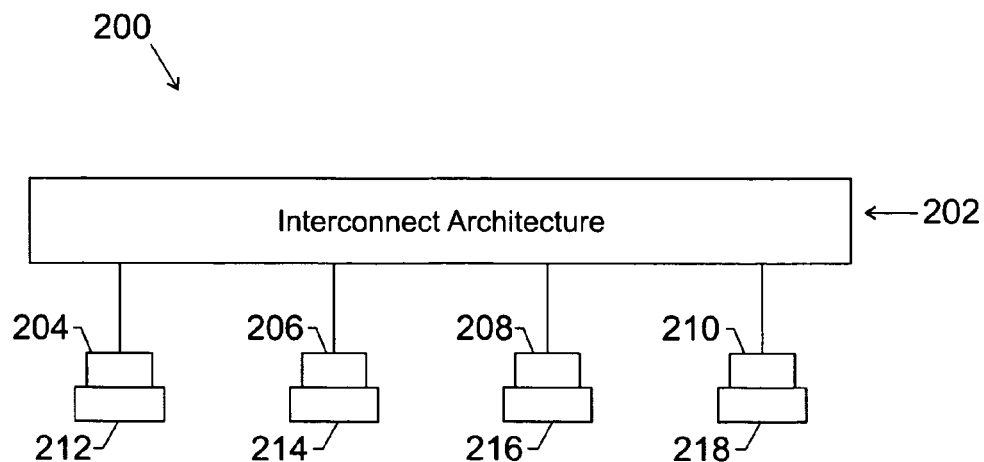
FIG. 2 is a block diagram of a computer system with a flexible PCI interconnect architecture in accordance with exemplary embodiments of the present invention.

Looking next to FIG. 2, a block diagram of a computer system with a flexible PCI interconnect architecture in accordance with exemplary embodiments of the present invention is illustrated and generally designated by the reference numeral 200. The system 200 is comprised of an interconnect architecture 202, a series of connection points 204-210, and a series of computer components 212-218. It should be understood that the system 200 depicts four connection points 204-210 and four computer components 212-218 for illustrative purposes only. Those skilled in the art will appreciate that the number of connection points and the number of computer components may be higher or lower in different embodiments of the invention.

The interconnect architecture 202 may be comprised of one or more PCI multi-port bridges. As will be described in greater detail below, the PCI multi-port bridges in the interconnect architecture 202 function differently than the standard PCI multi-port bridges 108*a-f* described above in relation to FIG. 1.

The connection points 204-210 may be any type of interface suitable for coupling one of the computer components 212-218 to the interconnect architecture 202. In one embodiment of the invention, one of the connection points 204-210 may be a card slot. In an alternate embodiment of the invention, one of the connection points 204-210 may be a blade connection slot. Those skilled in the art will also appreciate that in exemplary embodiments of the invention, the connection points 204-210 may include logic to facilitate communication between the various computer components 212-218. In one embodiment of the invention, this logic may comprise an application specific integrated circuit (ASIC).

The computer components 212-218 may be any type of component that is typically connected to an interconnect architecture. One of the computer components 212-218 will typically be a controller. The controller may be any type of component that can manage the interconnect architecture 202. Examples of suitable controllers include, but are not limited to, a processor, a group of processors, a computer system, or a system management unit. The remaining computer components 212-218 may be either other controllers or any type of computer component that is typically connected to an interconnect architecture. Examples of computer components that are typically connected to an interconnect architecture include, but are not limited to, input/output (I/O) devices, hosts, video cards, external storage devices, and interface cards.

Figure 3:
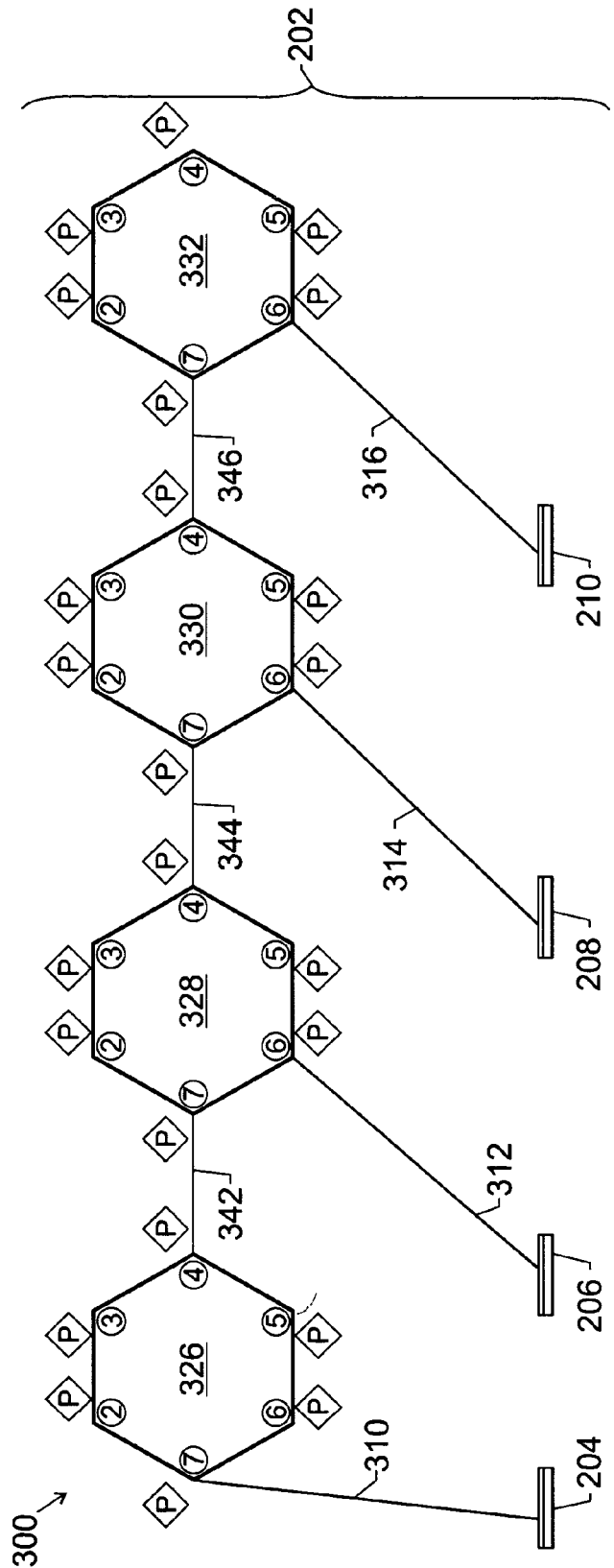
FIG. 3 is a block diagram of a computer system with a flexible PCI interconnect architecture in a neutral state, in accordance with exemplary embodiments of the present invention.

Turning now to FIG. 3, a more detailed block diagram of a computer system with a flexible PCI interconnect architecture computer system in a neutral state in accordance with exemplary embodiments of the present invention is illustrated and generally designated by the reference numeral 300. The system 300 may comprise one or more connection points 204-210 each configured to couple a computer component, such as the computer components 212-218 (FIG. 2), into the system 300. The system 300 is shown with four connection points 204-210 for illustrative purposes only. In one embodiment of the invention, any type of computer component may be coupled to any of the connection points 204-210. In another embodiment of the invention, one or more of the connection points may be designated for controllers only.

Each of the connection points 204-210 is coupled to a PCI multi-port bridge 326-332. In one embodiment, the PCI multi-port bridges 326-332 are referred to as PCI switches. For illustrative purposes, each of the connection points 204-210 has a respective connection 310-316 to one of the PCI multi-port bridges 326-332, but there may be more than one connection 310-316 coupled to each PCI multi-port bridge 326-332 as will be appreciated by those skilled in the art. For instance, in the system 300, the connection point 204 is connected to the PCI multi-port bridge 326 through the connection 310. Similarly, connection point 210 is connected to the PCI multi-port bridge 332 through the connection 316. Each of the PCI multi-port bridges 326-332 in the system 300 is depicted with six ports-labeled as ports 2-7. In alternate embodiments, the PCI multi-port bridges 326-332 may have a different number of ports or the ports may be designated differently. The PCI multi-port bridges 326-332 maybe interconnected with each other by interconnects 342-346.

The system 300 is depicted in FIG. 3 immediately after a system reset. In this state, the PCI multi-port bridges 326-332 are set in a neutral state. In the embodiment depicted in FIG. 3, the neutral state is characterized by each of the six ports on each the PCI multi-port bridges 326-332 being set as a primary port. Primary ports are represented in FIG. 3 by the letter "P" inside a diamond shape, (secondary ports—FIGS. 5 and 6) are represented by the letter "S" inside a diamond shape). The system 300 will remain in the neutral state until a controller 402 (illustrated and described further below with reference to FIG. 4 and FIG. 5) is coupled to one of the connection points 204-210.

Figure 4:
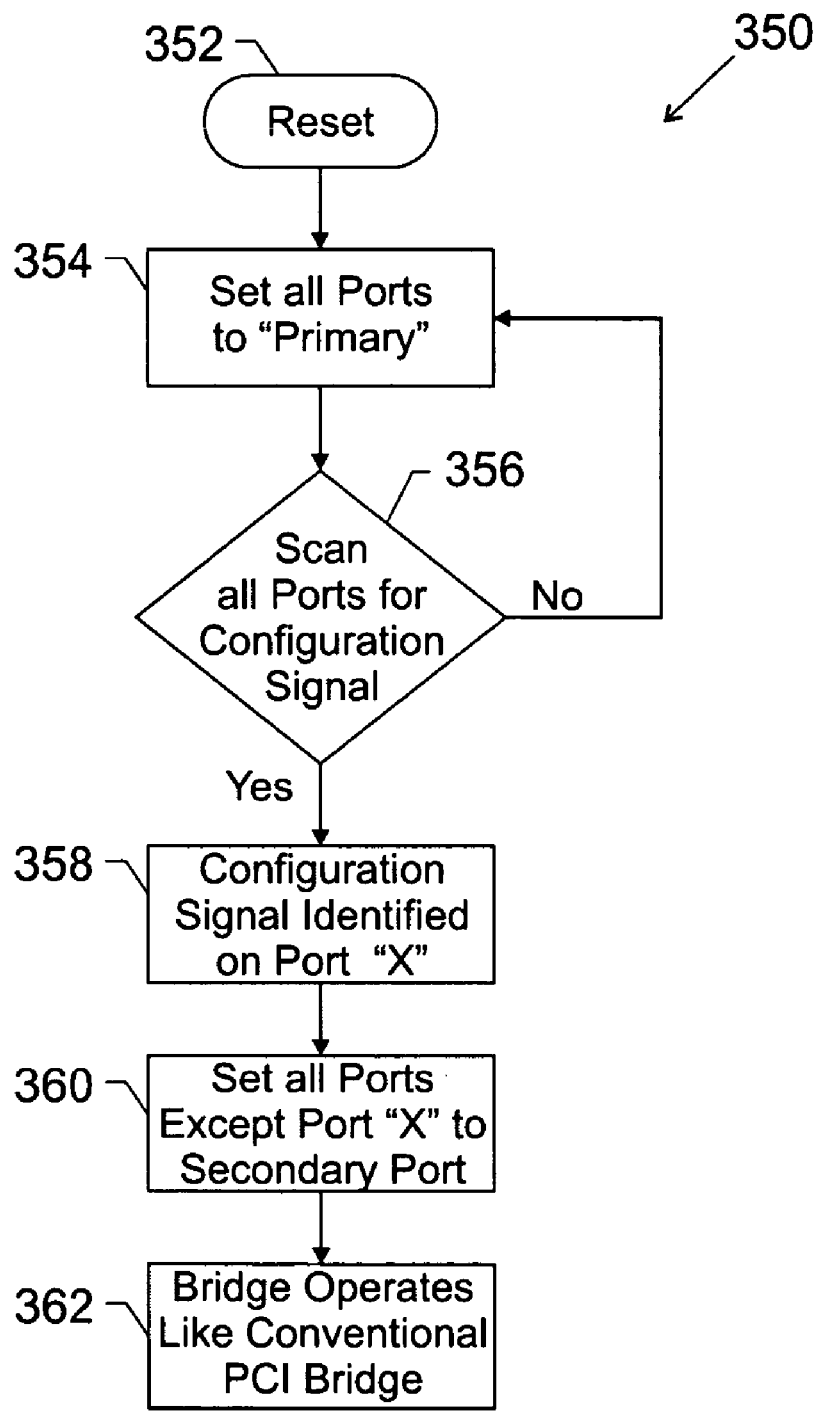
FIG. 4 is a flow chart illustrating an exemplary process for automatically setting a primary port on a PCI multi-port bridge in accordance with exemplary embodiments of the present invention.

Referring now to FIG. 4, a flow chart illustrating an exemplary process suitable for automatically setting a primary port on a PCI multi-port bridge in accordance with exemplary embodiments of the present invention is depicted and generally designated by a reference numeral 350. In one embodiment, the system 300 employs the process 350 in configuring the PCI multi-port bridges 326-332. For illustrative purposes, the process 350 will be described in reference to the configuration of PCI multi-port bridge 328. It should be understood, however, that the same process will typically apply to the configuration of the other PCI multi-port bridges in the system 300.

When the process 350 begins, the PCI multi-port bridge 328 has just been reset, as shown in block 352. Accordingly, as described above, the PCI multi-port bridge 328 sets all of its ports as primary ports as indicated in block 354. Next, as shown in block 356, the PCI multi-port bridge 328 will remain in this neutral state (i.e. all ports set as primary ports) and monitor its ports for a configuration signal. The configuration signal may be transmitted by either a controller or by another one of the PCI multi-port bridges 326-332. The configuration signal will typically be transmitted by the controller for the first one of the PCI multi-port bridges 326-332 to be configured, and by another one of the PCI multi-port bridges 326-332 for the remaining PCI multi-port bridges 326-332 in the system 300. The configuration signal may be any type of signal that permits one of the PCI multi-port bridges 326-332 to recognize that the signal is intended for that particular PCI multi-port bridge 326-332. The types of configuration signals include, but are not limited to, a signal that is part of a configuration cycle, a signal that is a configuration command, or a signal that is the assertion of an initialization device select ("IDSEL") pin.

Figure 5:
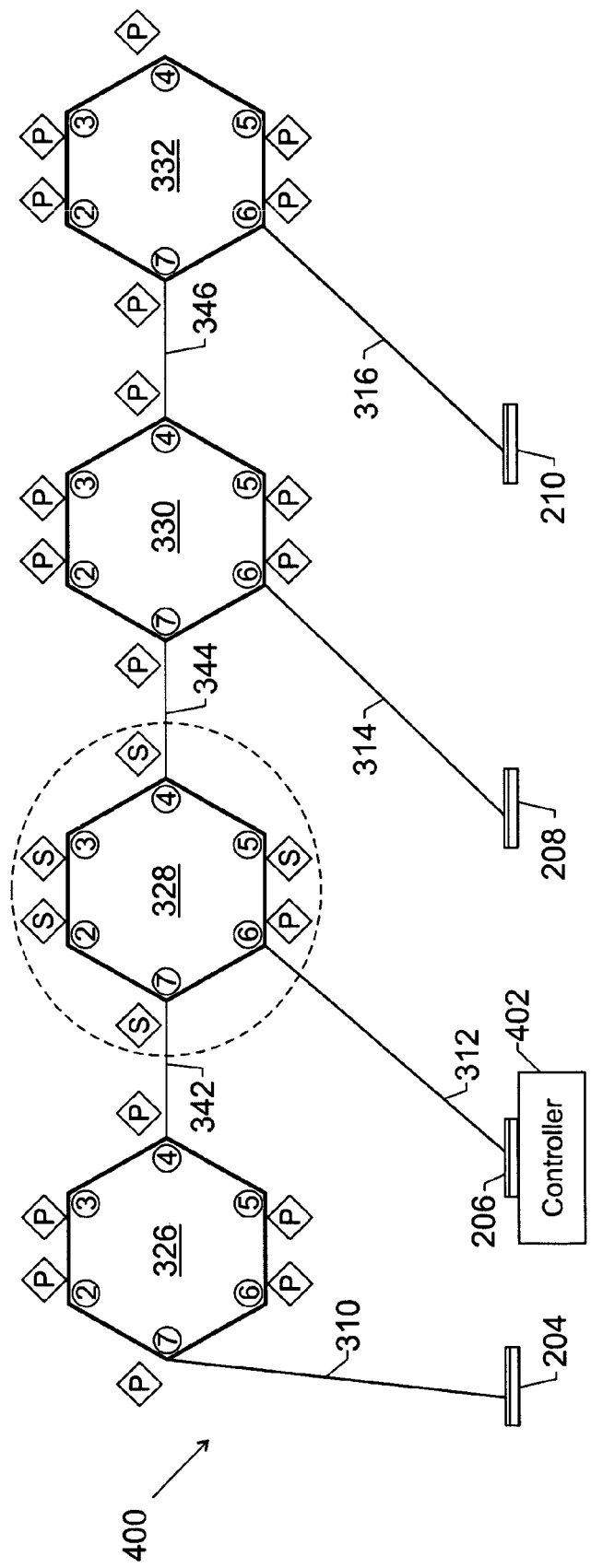
FIG. 5 is a block diagram of a computer system with a flexible PCI interconnect architecture with one PCI multi-port bridge set, in accordance with exemplary embodiments of the present invention.

When the PCI multi-port bridge 328 detects a configuration signal on one of its ports (block 358), it will set every one of its ports except the port that detected the configuration signal as secondary ports as indicated in block 360. For instance, FIG. 5 illustrates block diagram of a computer system with a flexible PCI interconnect architecture with one PCI multi-port bridge set in accordance with exemplary embodiments of the present invention. It is generally designated by a reference numeral 400. The system 400 illustrates the system 300 after the PCI multi-port bridge 328 has automatically set its primary port and secondary ports. For simplicity, like reference numerals have been used to designate those features previously described with reference to FIG. 3.

As described above with reference to FIG. 4, after a controller 402 is connected to the connection point 206, the controller 402 may transmit a configuration signal over the connection 312 to the PCI multi-port bridge 328. As stated above, in one embodiment the configuration signal is the assertion of an IDSEL pin. Upon receiving the configuration signal, the PCI multi-port bridge 328 designates the port that received the signal (port 6) as the primary port for the PCI multi-port bridge 328 and then designates the remaining five ports (ports 2-5 and 7) as secondary ports.

As indicated in block 362 of FIG. 4, once the ports 2-5 and 7 have been set as secondary ports, the PCI multi-port bridge 328 can function similarly to the standard PCI multi-port bridges 108a-f described above in reference to FIG. 1. This is the case because the PCI multi-port bridge 328 now has only one primary port (port 6), and that primary port is facing upstream towards the controller 402.

The process 350 will be repeated for each of the PCI multi-port bridges 326-332 in the system 400. The PCI multi-port bridges 326-332 may be configured in any order. Typically, the configuration order will be determined by the controller 402, which may be programmed to configure the PCI multi-port bridges 326-332 in any order. In one embodiment of the invention, the PCI multi-port bridges 326-332 are configured in a radial pattern based on port number. Specifically in regard to the system 400 depicted in FIG. 5, after configuring the PCI multi-port bridge 328, the configuration process 350 would continue on the non-configured PCI multi-port bridge 326-332 connected to the lowest number port on the PCI multi-port bridge 328. In this case, because the PCI multi-port bridge 330 is connected to the PCI multi-port bridge's 328 lowest number port (port 4), the PCI multi-port bridges 328 would transmit a configuration signal over the interconnect 344. When the PCI multi-port bridge 330 finishes the configuration process 350, it would in-turn transmit a configuration process to another one of the PCI multi-port bridges 326-332 that is connected to its lowest number port. This process will continue and each one of the PCI multi-port bridges 326-332 will subsequently move from the lower numbered ports to the higher numbered ports once all of the PCI multi-port bridges 326-332 connected to the lower numbered ports have been configured. It is important to note that in alternate embodiments, the PCI multi-port bridges 326-332 may be configured to cycle through their ports in any order.

Figure 6:
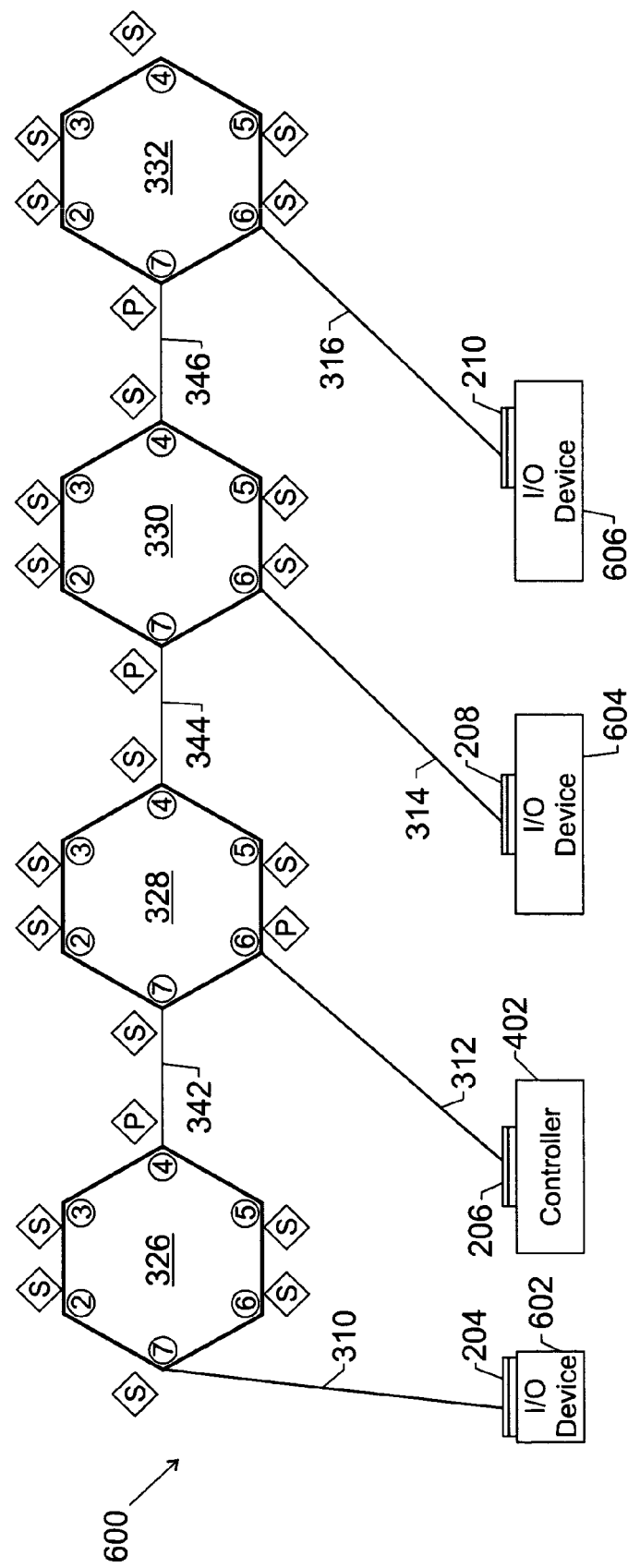
FIG. 6 is a block diagram of a computer system with a flexible PCI interconnect architecture with all of its PCI multi-port bridges set, in accordance with exemplary embodiments of the present invention.

Turning last to FIG. 6, a block diagram of a computer system with a flexible PCI interconnect architecture with all of its PCI multi-port bridges set, in accordance with exemplary embodiments of the present invention, is illustrated and generally designated by the reference numeral 600. The system 600 illustrates the system 400 after each of the PCI multi-port bridges 326-332 has automatically set its primary port and secondary ports. Additionally, the system 600 includes three I/O devices 602-606, which have been coupled to the connection points 204, 208, and 210 respectively. It is important to note that the system 600 is shown with three I/O devices for illustrative purposes only. In alternate embodiments, any computer component that is typically connected to an interconnect architecture could be coupled to any of the connection points 204, 208, and 210. As stated above, computer components that are typically connected to an interconnect architecture include, but are not limited to, input/output (I/O) devices, hosts, video cards, external storage devices, and interface cards.

Each of the PCI multi-port bridges 326-332 shown in FIG. 6 has only one primary port and that primary port is pointing upstream towards the controller 402. It is important to note that this result would be the same if the controller 402 had been connected to a connection point other than connection point 206. Even though the settings of individual ports would be different in that case, each of the PCI multi-port bridges 326-332 would still only have one primary port and that primary port would still be facing upstream toward the connection point 204-210 coupled to the controller 402. In this way, the system 600 provides for consistent operation regardless of the connection point of the controller 402.

Many of the steps of the exemplary process described above with reference to FIG. 4 may comprise an ordered listing of executable instructions for implementing logical functions. The ordered listing can be embodied in any computer-readable medium for use by or in connection with a computer-based system that can retrieve the instructions and execute them to carry out the previously described processes of automatically setting the ports of the PCI devices. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). It is even possible to use paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of setting a primary port on a PCI multi-port bridge comprising:
   detecting a configuration signal at the PCI multi-port bridge; and
   automatically setting a primary port on the PCI multi-port bridge based on the configuration signal, wherein only one port on the PCI multi-port bridge is set as the primary port once configuration of the PCI multi-port bridge is complete.

2. The method, as set forth in claim 1, wherein detecting the configuration signal comprises detecting assertion of an Initialization Device Select (IDSEL) pin.

3. The method, as set forth in claim 1, wherein detecting the configuration signal comprises detecting a configuration command.

4. The method, as set forth in claim 1, wherein detecting the configuration signal comprises detecting a configuration cycle.

5. The method, as set forth in claim 1, comprising automatically setting the remaining ports on the PCI multi-port bridge as secondary ports.

6. The method, as set forth in claim 1, comprising placing the PCI multi-port bridge in a neutral state.

7. The method, as set forth in claim 6, wherein placing the PCI multi-port bridge in a neutral state comprises setting all of the ports on the PCI multi-port bridge as primary ports.

8. The method, as set forth in claim 1, comprising coupling a controller to the PCI multi-port bridge.

9. The method, as set forth in claim 8, wherein coupling a controller to the PCI multi-port bridge comprises coupling a processor to a connection point.

10. The method, as set forth in claim 8, wherein coupling a controller to the PCI multi-port bridge comprises coupling a management unit to a connection point.

11. A computer system comprising:
a controller; and
a PCI multi-port bridge coupled to the controller and configured to:
detect a configuration signal at the PCI multi-port bridge; and
automatically set a primary port on the PCI multi-port bridge based on the configuration signal, wherein only one port on the PCI multi-port bridge is set as the primary port once configuration of the PCI multi-port bridge is complete.

12. The computer system, as set forth in claim 11, wherein the PCI multi-port bridge configured to detect the configuration signal comprises a PCI multi-port bridge configured to detect assertion of an IDSEL pin.

13. The computer system, as set forth in claim 11, wherein the PCI multi-port bridge configured to detect the configuration signal comprises a PCI multi-port bridge configured to detect assertion of a configuration cycle.

14. The computer system, as set forth in claim 11, wherein the controller is a processor.

15. The computer system, as set forth in claim 11, wherein the controller is a group of processors.

16. The computer system, as set forth in claim 11, wherein the controller is a management unit.

17. The computer system, as set forth in claim 11, comprising a computer component coupled to the PCI multi-port bridge.

18. The computer system, as set forth in claim 17, wherein the computer component is configured to be coupled to the PCI multi-port bridge at a connection point.

19. The computer system, as set forth in claim 18, wherein the connection point comprises a card slot.

20. The computer system, as set forth in claim 18, wherein the connection point comprises a blade connection slot.

21. The computer system, as set forth in claim 17, wherein the computer component comprises an Input Output (I/O) device.

22. The computer system, as set forth in claim 17, wherein the computer component comprises a host.

23. The computer system, as set forth in claim 17, wherein the computer component comprises an external storage device.

24. The computer system, as set forth in claim 17, wherein the computer component comprises an interface card.

25. A method of configuring an interconnect architecture comprising a PCI multi-port bridge having a plurality of ports, comprising:
coupling a controller to a first of the plurality of ports of the PCI multi-port bridge in the interconnect architecture;
automatically setting the first of the plurality of ports as a primary port; and
automatically setting the remainder of the plurality of ports as secondary ports.

26. The method, as set forth in claim 25, comprising setting each of the plurality of ports as primary ports before coupling the controller to the first of the plurality of ports.

27. The method, as set forth in claim 25, wherein coupling a controller to a first of the plurality of ports comprises coupling a processor to a first of the plurality of ports of the PCI multi-port bridge in the interconnect architecture.

28. The method, as set forth in claim 25, wherein coupling a controller to a first of the plurality of ports comprises coupling a management unit to a first of the plurality of ports of the PCI multi-port bridge in the interconnect architecture.

29. A computer system comprising:
a controller;
a plurality of PCI multi-port bridges, wherein a first of the plurality of PCI multi-port bridges is coupled to the controller through a port, and wherein each of the plurality of PCI multi-port bridges is configured to automatically set a primary port on the respective PCI multi-port bridge in response to assertion of a configuration signal, wherein only one port on each of the plurality of PCI multi-port bridges is set as the primary port once configuration of each of the plurality of PCI multi-port bridge is complete;
an I/O device coupled to a second of the plurality of PCI multi-port bridges; and
an external storage device coupled to a third of the plurality of PCI multi-port bridges.

30. The computer system, as set forth in claim 29, comprising an interface card coupled to a fourth of the plurality of PCI multi-port bridges.

31. The computer system, as set forth in claim 29, comprising a video card coupled to a fourth of the plurality of PCI multi-port bridges.

32. The computer system, as set forth in claim 29, comprising a host coupled to a fourth of the plurality of PCI multi-port bridges.

33. A computer system comprising:
a controller;
a PCI multi-port bridge coupled to the controller and configured to:
detect a assertion of a configuration signal at the PCI multi-port bridge; and
automatically set a primary port on the PCI multi-port bridge based on the configuration signal, wherein only one port on the PCI multi-port bridge is set as the primary port once configuration of the PCI multi-port bridge is complete; and
an I/O device configured to be coupled to the PCI multi-port bridge at a card slot.

34. A method of configuring a PCI multi-port bridge comprising:
automatically setting a port coupled to a PCI multi-port bridge as a primary port; and
automatically setting the ports not coupled to the PCI multi-port bridge as secondary ports.

35. A compute readable storage medium having executable code, wherein the code comprises:

code for detecting a configuration signal at a PCI multi-port bridge;

code for automatically setting a single primary port on the PCI multi-port bridge based on the configuration signal; and code for automatically setting all remaining ports on the PCI multi-port bridge, not set as the primary port, as secondary ports.

36. The computer system of claim 11, wherein the PCI multi-port bridge is configured to place the PCI multi-port bridge in a neutral state by setting all of the ports on the PCI multi-port bridge as primary ports.

37. The computer system of claim 29, wherein each of the plurality of PCI multi-port bridges is configured to place the PCI multi-port bridge in a neutral state by setting all of the ports on the PCI multi-port bridge as primary ports.

38. The computer system of claim 33, wherein the PCI multi-port bridge is configured to place the PCI multi-port bridge in a neutral state by setting all of the ports on the PCI multi-port bridge as primary ports.

39. The method of claim 34, comprising:

setting all of the ports on the PCI multi-port bridge as primary ports to place the PCI multi-port bridge in a neutral state.

40. The compute readable storage medium of claim 35, wherein the code comprises:

code for setting all of the ports on the PCI multi-port bridge as primary ports to place the PCI multi-port bridge in a neutral state.

* * * * *